Oct. 27, 1970 E. LAKATOS 3,537,008

COMMUNICATIONS SYSTEM INCORPORATING MEANS FOR COMBATTING MULTIPATH INTERFERENCE

Filed May 9, 1967 4 Sheets-Sheet 1

Emory Lakatos
*INVENTOR.*

BY [signature]

AGENT

Emory Lakatos
INVENTOR.
BY
AGENT

Oct. 27, 1970 E. LAKATOS 3,537,008

COMMUNICATIONS SYSTEM INCORPORATING MEANS FOR COMBATTING MULTIPATH INTERFERENCE

Filed May 9, 1967 4 Sheets-Sheet 3

Emory Lakatos
*INVENTOR.*

BY

AGENT

Emory Lakatos
INVENTOR.
BY
Alfons Valukonis
AGENT

United States Patent Office 3,537,008

Patented Oct. 27, 1970

3,537,008

COMMUNICATIONS SYSTEM INCORPORATING MEANS FOR COMBATTING MULTIPATH INTERFERENCE

Emory Lakatos, Santa Monica, Calif., assignor to TRW Inc., Redondo Beach, Calif., a corporation of Ohio Filed May 9, 1967, Ser. No. 637,226
Int. Cl. H04b 7/02
U.S. Cl. 325—65 34 Claims

ABSTRACT OF THE DISCLOSURE

A communications system whereby broad band analog or digital message signals can be sent and recovered from a multipath transmission medium without the presence of echo signals. The apparatus provides for the transmission of pilot signals along with the message signal, with one of the pilot signals being modulated in a predetermined manner. The known composition of the modulated pilot signal permits a continuous monitoring of the state of the transmitting medium. It has been established that this state is almost identical for both the message and pilot signals. This knowledge of the medium state is then used to eliminate the echo signals from the received signal, yielding merely the message signal at a uniform level and signal to noise ratio.

BACKGROUND OF THE INVENTION

Field of the invention

This invention relates to a communications system, and more particularly relates to a communications system providing improved radio reception in environments where more than one signal propagation path is present.

Description of the prior art

In communication systems wherein the transmitter and receiver are elevated, as in a satellite and a high-flying aircraft, respectively, the existence of multiple signal propagation paths creates problems in signal reception. In such cases, the input to the receiver on the aircraft is comprised of a signal arriving over the direct propagation path and echo signals reflected from underlying terrain and traveling over longer echo paths. The resultant input signal to the receiver has two very serious defects. One such defect is that the radio frequency field strength at the receiver is subject to deep fading due to interference between the direct signal and the echoes, thus enhancing the effect of receiver noise. The other defect is that the information elements of the message are masked by the information elements carried by the echoes. This limits the data transmission rate to very low values. Masking arises because of difference in propagation times of the direct signal and echo signals traveling over the echo paths, respectively. For example, if the aircraft is at about a 70,000 ft. altitude, and the satellite is directly overhead, this difference amounts to about 140 microseconds. Thus, a signal element arriving over the direct path is masked by a signal element which was transmitted 140 microseconds earlier, but which arrives now by reason of having traveled over an echo path.

Some present techniques for combatting mutipath interference use either a narrow beam steerable antenna to reject undesirable signals by means of angle of arrival discrimination, or by the selection of a best carrier frequency among several. Though discrimination by angle of arrival has some advantages, the necessary provision of a high gain, low sidelobe, steerable antenna on a high speed aircraft is impractical. In multifrequency carrier techniques the data transmission rate is low and no capability for transmitting analog signals is provided.

Another example of an antimultipath communications system is revealed in U.S. Pat. No. 2,982,853 wherein the signals arriving over each path are detected individually, then added after weighting by a factor maximizing the signal-to-noise ratio of the sum of the signals. One other example of a communication apparatus for eliminating multipath distortion is shown in U.S. Pat. No. 3,168,699 wherein a time compression technique is utilized. In U.S. Pat. No. 2,982,853 asymmetrical waveforms representing each symbol of a coded message are utilized to eliminate multipath distortion.

SUMMARY OF THE INVENTION

Figure 1:
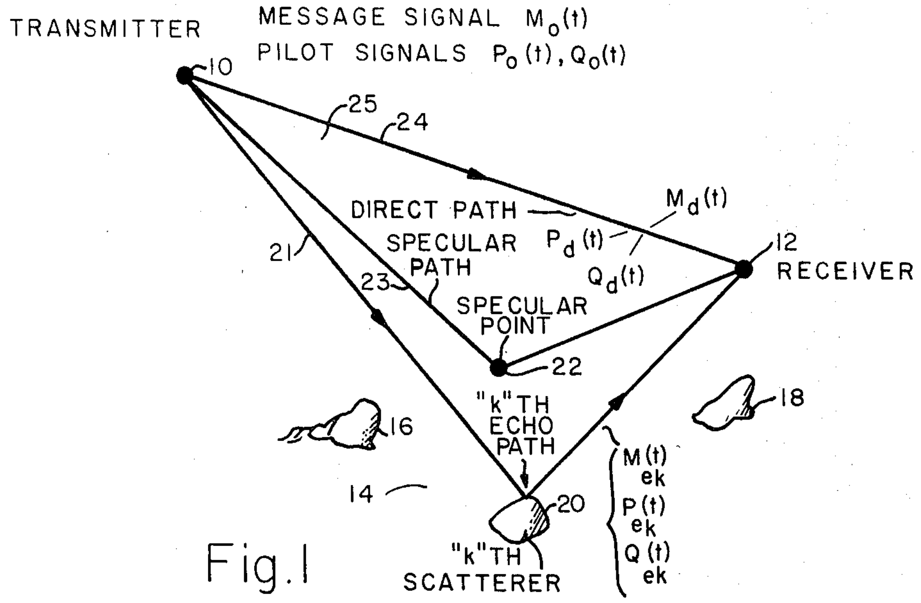
FIG. 1 is a schematic view showing an arrangement wherein the present invention finds utility.

According to one aspect of the invention there is provided a communications system having a transmitter which radiates message, continuous pilot, and pulsed pilot signals having first, second, and third carrier frequencies, respectively, through a transmission medium wherein multipath effects produce summed message, summed continuous pilot, and summed pulsed pilot signals, respectively. The summed signals each includes a direct path signal and an echo signal. A receiver is provided which recovers the direct path message signal from the summed signals.

According to another aspect of the invention there is provided a receiver time delay measurer circuit which measures the time delay between a pair of signals and wherein a first gate circuit passes the pair of signals when opened and prevents passage of any signals when closed. A pulse generator connected to the first gate circuit and responsive to the pair of signals generates a pair of pulses. A timer circuit connected to the pulse generator and the first gate circuit and responsive to the pair of pulses generates a timing signal which is representative of the time interval between the pair of pulses. The pulse generator also provides a first gating signal to open the first gate circuit after a predetermined period of time. A storage circuit connected to the pulse generator and the first gate circuit and responsive to the pair of pulses generates a second gating pulse to close the first gate circuit. A second gate circuit connected to the timer circuit and the storage circuit is provided. The second gate circuit is responsive to the gating pulse to pass the timing signal. A circuit means connected to the second gate circuit converts the timing signal into an analog signal. A circuit connected to the converting circuit holds the analog signal to provide the delay signal.

According to still another aspect of the invention a signal extracting circuit is provided for the receiver and wherein it has a negative feedback amplifier which is responsive to the above-mentioned summed message signal. A signal summing means is also provided which is responsive to the summed continuous pilot signal and a signal which simulates the direct path continuous pilot signal so as to produce the continuous pilot echo signal.

A first signal multiplier circuit connected to the output of the negative feedback amplifier and responsive to the simulating signal provides a product signal representing the product of the direct path message signal and the simulating signal. Signal filter means connected to the multiplier circuit passes the direct message signal of the product signal at a carrier frequency which is the difference between the above-mentioned first and second carrier frequencies. A variable signal time delay means connected to the signal filter means and responsive to a delay signal which represents a delay time interval provides in its output a delayed direct path message signal at the above-mentioned difference carrier frequency and delayed a time interval represented by the delay signal. A second signal multiplier circuit means is connected through a gain control circuit to the signal summing means and the variable delay means provides in its output a product signal representing the product of the continuous pilot echo signal and the delayed direct path mess age signal. A signal filter connected to the second multiplier circuit and the negative feedback amplifier passes the second product signal at the first carrier frequency to the feedback amplifier to provide in its output the direct path message signal at the first carrier frequency.

DESCRIPTION OF THE PREFERRED EMBODIMENT

FIG. 1 shows a transmitter 10 and receiver 12, both of which are elevated above the terrain 14. The terrain may be regarded as being composed of a very large number of signal scatterers such as 16 and 18. A typical scatterer, the "*k*th," is designated by the numeral 20 and is shown as defining a typical echo path 21. For purposes of reference it is convenient to introduce the concept of the specular point 22, which defines the shortest instantaneous path, the specular path 23, between the transmitter 10 and the receiver 12. The transmitter 10 and receiver 12 are adapted to being in motion as by being on a satellite (not shown), and an aircraft (not shown), respectively. It is to be appreciated that the scatterers may also be in motion, as in the case of ocean waves or vegetation disturbed by wind.

The transmitter 10 emits a message signal $M_o(t)$, having a carrier radian frequency $\omega_o$, and a pair of pilot signals $P_o(t)$, and $Q_o(t)$ of radian frequencies $\omega_1$ and $\omega_2$, respectively, through a transmission medium 25. The signal $P_o(t)$ is an unmodulated sine wave signal, and $Q_o(t)$ is a modulated sine wave signal. Preferably, as will hereinafter be more fully set forth, the three frequencies $\omega_o$, $\omega_1$, and $\omega_2$ are phase locked together. The frequencies $\omega_1$ and $\omega_2$ can be selected as desired, but preferably each should be within a few megahertz of the message carrier frequency $\omega_o$. Over a direct path 24, the receiver 12 receives the signals $M_d(t)$, $P_d(t)$, and $Q_d(t)$. These signals differ from the signals $M_o(t)$, $P_o(t)$, and $Q_d(t)$, respectively, by a space-loss factor, path time delay, and doppler effects due to the relative motion of the transmitter 10 and receiver 12. The receiver 12 also picks up the echoes from the various scatterers. The echoes $M_{ek}(t)$, $P_{ek}(t)$, and $Q_{ek}(t)$ differ from the direct path signals $M_d(t)$, $P_d(t)$, and $Q_d(t)$ in that the path lengths traversed by each of these echo signals are always longer than those traversed by the direct path signals. The doppler effect could also be different in some cases because of scatterer motion and other velocity effects. There are also amplitude and phase factors associated with the echoes, which are not present on the direct path, because of reflection and scattering phenomena. Further, the antenna gain and phase encountered by the echoes may differ from that seen in the direct path.

Thus, the receiver 12 picks up not only the direct transmissions $M_d(t)$, $P_d(t)$, $Q_d(t)$, but also the totality of echoes $$\sum^{k} M_{ek}(t),\ \sum^{k} P_{ek}(t),\ \sum^{k} Q_{ek}(t)$$

For simplicity of notation, these sums may be designated as $M_e(t)$, $P_e(t)$, and $Q_e(t)$.

It is clear then that the total input to the receiver 12, in the respective signal classes is given by $$M_{sum}(t)=M_d(t)+M_e(t) \quad (1)$$
$$P_{sum}(t)=P_d(t)+P_e(t) \quad (2)$$
$$Q_{sum}(t)=Q_d(t)+Q_e(t) \quad (3)$$

Up to this point, the various symbols represent real or physical quantities. It is convenient henceforth to deal with their corresponding complex quantities, which will be denoted by bars over the letters. It can then be shown that these sums can be expressed as follows:

$$\overline{M}_{sum}(t)=\overline{M}_d(t)+\overline{M}_d(t-\tau)\overline{R}(t) \quad (4)$$
$$\overline{P}_{sum}(t)=\overline{P}_d(t)+\overline{P}_d(t-\tau)\overline{R}(t) \quad (5)$$
$$\overline{Q}_{sum}(t)=\overline{Q}_d(t)+\overline{Q}_d(t-\tau)\overline{R}(t) \quad (6)$$

where $\tau$ is the excess time delay over the shortest or specular path 23 relative to the direct path 24. Also, $\overline{R}(t)$ called the reflectance function is of the form $$\overline{R}(t)=A(t)e^{i\phi(t)} \quad (7)$$

where $A(t)$ is the real envelope function whose amplitude changes relatively slowly with time. It is always positive and less than unity.

The phase $\Phi(t)$ is also a slowly changing function of time. It arises from the doppler effects of the scatterer motion already referred to and other phase phenomena which are not present on the direct path. Thus, $\overline{R}(t)$ is an oscillatory function, whose frequency of oscillation can never exceed the doppler frequency spread due to scatterers 16, 18, 20, etc. It is estimated that under quite extreme conditions this doppler frequency spread is of the order of ±225 Hz. and that correspondingly, $A(t)$ would exhibit about 300 amplitude maxima per second.

In accordance with this invention apparatus is provided for recovering $M_d(t)$, the real part of $\overline{M}_d(t)$. The general background principle for achieving this is most easily explained by the following manipulation of Eqs. 4 and 5: Eliminate $\overline{R}(t)$ between this pair yielding the relation $$[\overline{M}_{sum}(t)-\overline{M}_d(t)]\overline{P}_d(t-\tau) - [\overline{P}_{sum}(t)-\overline{P}_d(t)]\overline{M}_d(t-\tau)=0 \quad (8)$$

It is desired to solve this equation for $\overline{M}_d(t)$ or what is the same thing, the equation corresponding to this in real variables from $M_d(t)$. The signals $M_{sum}(t)$ and $P_{sum}(t)$ are available. The delay $\tau$ can be measured by utilizing (6), as will be hereinafter more fully explained. The signals $P_d(t)$ and $P_d(t-\tau)$ can be simulated, as will also be explained by utilizing (6). Thus, (8) reduces to an equation involving the unknowns $\overline{M}_d(t)$ and $\overline{M}_d(t-\tau)$. However, since $\tau$ can be measured, these are related and thus $\overline{M}_d(t)$, and hence $M_d(t)$ can be found.

Figure 2:
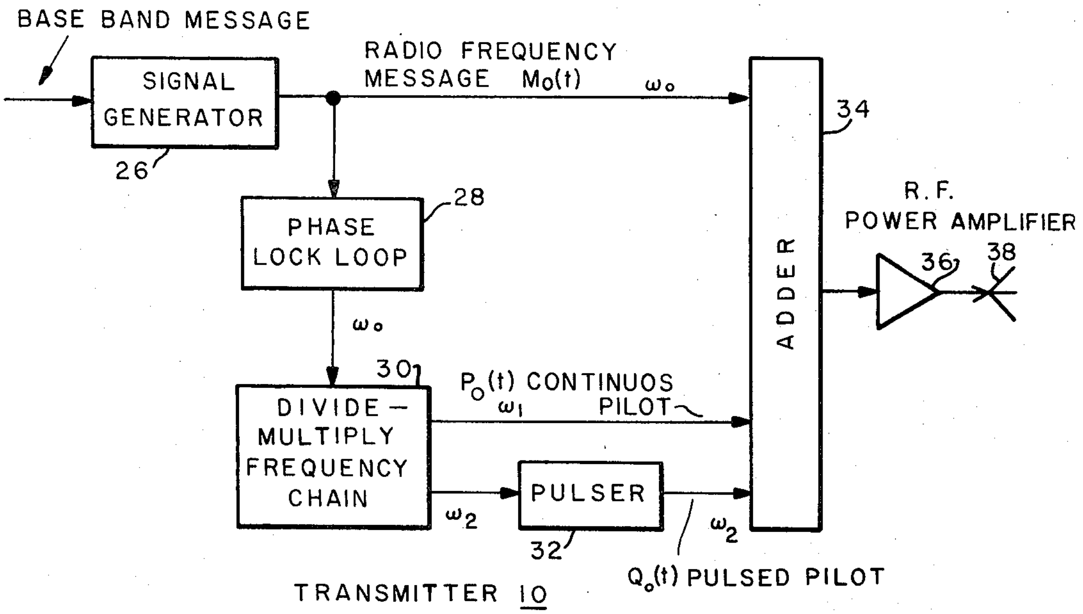
FIG. 2 is a block diagram showing of the transmitter of the present invention.

Reference is now made to FIG. 2 wherein the transmitter 10 is revealed in more detail. The numeral 26 designates a low power signal generator provided with the modulating message signal at base-band in its input, and in its output the message signal $M_o(t)$ at $\omega_0$ carrier frequency. A phase-lock loop 28 is provided which tracks the carrier frequency $\omega_0$ and produces an output sine wave signal at the carrier frequency $\omega_0$. The sine wave signal from the phase-lock loop 28 is applied to a frequency divide-multiply chain 30 which provides two outputs. One output is a sine wave signal at a frequency $\omega_1$ that is the continuous pilot signal $P_o(t)$, and the other is a sine wave signal at $\omega_2$ frequency. The signal at $\omega_2$ frequency is applied to a pulser 32 which provides in its output the pulsed signal $Q_o(t)$ at a frequency $\omega_2$. The three signals $M_o(t)$, $P_o(t)$, and $Q_o(t)$ are provided as inputs to an adder 34 wherein they are summed and the summed output signal amplified by radio frequency power amplifier 36 before being applied to the transmitting antenna 38.

Figure 3:
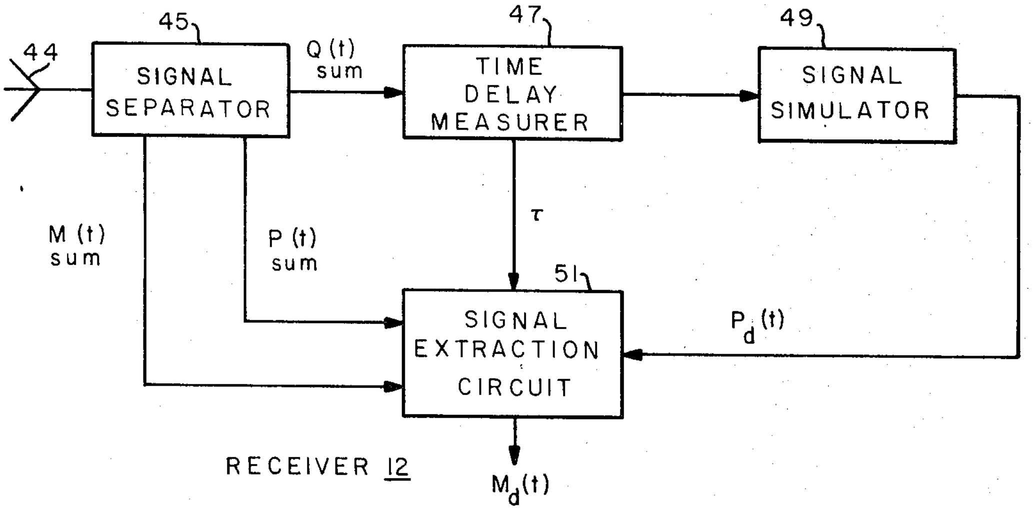
FIG. 3 is a block diagram showing of the receiver of the present invention.

The receiver 12 is generally shown in FIG. 3 as consisting of a receiving antenna 44 connected to a signal separator 45. The signal separator 45 provides separation of the signals $M_{sum}(t)$, $P_{sum}(t)$, and $Q_{sum}(t)$. The signal $Q_{sum}(t)$ is fed to a delay measurer 47 which measures the time delay $\tau$ and provides in its output a signal representing this time delay. A signal simulator 49 connected to the delay measurer 47 generates a signal simulating the signal $P_d(t)$. A signal extraction circuit 51 connected to the signal separator 45, the delay measurer 47, and the signal simulator 49 and responsive to the signals $M_{sum}(t)$, $P_{sum}(t)$, and $P_d(t)$ and the time delay signal representing the delay $\tau$, serves to provide the message signal $M_d(t)$ in its output.

Figure 4:
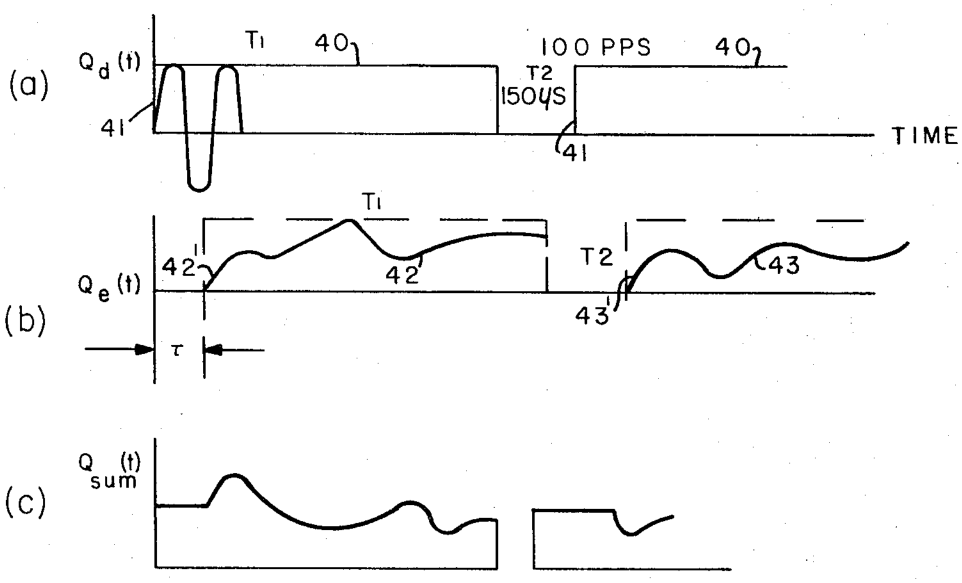
FIGS. 4(*a*) and 4(*b*) are waveforms to be found in the circuit of the present invention.

Reference is made to FIGS. 4(*a*) and 4(*b*). FIG. 4(*a*) shows the envelopes of a train of pulses 40 of the signal $Q_d(t)$. The leading edges of the pulses 40 are indicated by the numeral 41. Each pulse 40 has a duration of $T_1$ seconds with a pause time $T_2$ seconds between the pulses. In FIG. 4(*b*) the echo signal $Q_e(t)$ is shown as consisting of envelopes 42 and 43 also of duration of $T_1$ with an in between pause time $T_2$. The leading edges of the envelopes 42 and 43 are designated by the numerals 42' and 43'. Since even the shortest echo path, the specular path 23, is always longer than the direct path 24, during the time interval $\tau$, only the direct, fade-free signal transmission is received by the receiver 12. This enables the signal simulator 49 to track $Q_d(t)$ and thus to simulate $P_d(t)$. Practically, if the maximum value of $\tau$ is, for example, 140 microseconds, then $T_2$ should be made somewhat greater, for example, 150 microseconds, and the "on" time or $T_1$ should be on the order of 1 to 10 milliseconds. FIG. 4(C) shows the signal $Q_{sum}(t)$ envelopes.

Figure 5:
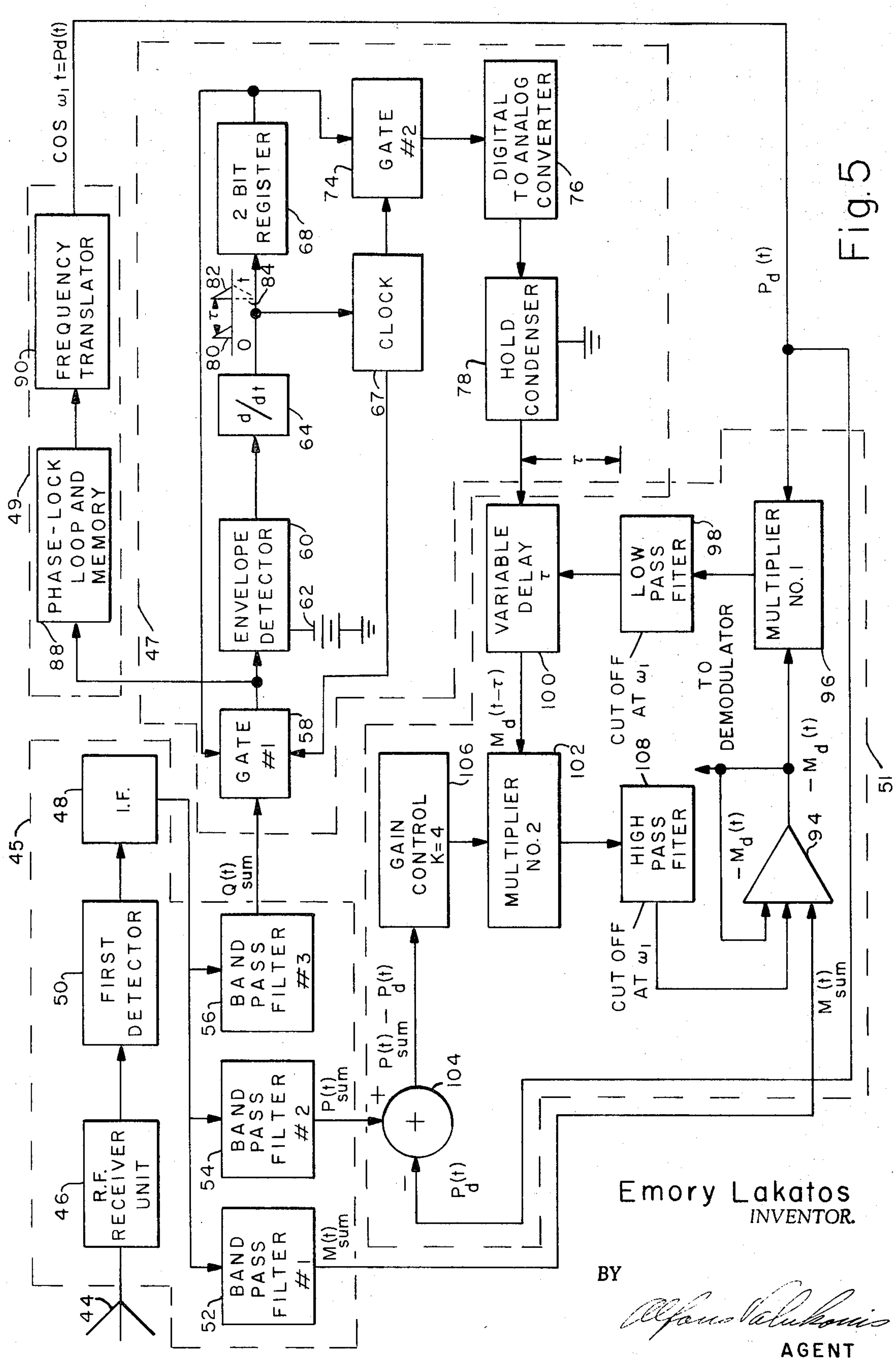
FIG. 5 is a block diagram showing in greater detail of the receiver of FIG. 3.

Reference is now made to FIG. 5 wherein the receiver 12 is shown in greater detail in block diagram form. The numeral designates the signal separator circuit 45 which provides for the separation of the signals $M_{sum}(t)$, $P_{sum}(t)$, and $P_{sum}(t)$. The antenna 44 serves to derive radio signals from the transmission medium which are then sent to an R.F. receiver unit 46 of the separator circuit. The output of unit 46 goes to an IF circuit 48 through a first detector 50. The center frequency of the unit 48 is established at some predetermined value, preferably at about 10 mHz. The output of the unit 48 is applied to three parallel arranged band-pass filters 52, 54, and 56, providing the outputs $M_{sum}(t)$, $P_{sum}(t)$, and $Q_{sum}(t)$, respectively.

The signal $Q_{sum}(t)$ of FIG. 4(*c*) is applied to the delay measurer circuit 47 for measuring the time delay $\tau$. The circuit 47 consists of a gate 58 whose output is applied to an envelope detector 60. The envelope detector 60 is provided with a small D.C. bias voltage by means of a battery or voltage source 62 to minimize receiver noise. A differentiator 64 serves to differentiate the output from the detector 60 and provides simultaneous inputs to a clock timer 67 and a 2-bit storage register 68. The clock timer 67 provides an input to the gate 58 and an input to a gate 74. The clock timer 67 can be a binary counter operating preferably at about 10 million bits per second. The output of the 2-bit register is simultaneously applied to the gate 58 and the gate 74. A digital to analog converter 76 receives the output of gate 74 and applies the voltage to a hold condenser 78.

Let it be assumed that at time $t=0$, the leading edge 41 of signal $Q_d(t)$, FIG. 4(*a*), emerges from the band-pass filter 56 and is directed to the gate 58, which is also assumed to be open. The directly received signal $Q_d(t)$ passes through the gate 58 to the envelope detector 60. From the envelope detector 60 the leading edge 41 of the pulse $Q_d(t)$ emerges quite sharply. As a result, the differentiator 64 fed by the envelope detector 60 generates a very sharp pulse 80 which is applied to the clock 67 to start it running. The pulse 80 is also applied to the 2-bit register 68, which is initially clear. When the echo signal $Q_e(t)$ is received, after a delay $\tau$, it adds in a vector sense to the signal $Q_d(t)$. Ot this time a sharp transient signal portion in the signal $Q_{sum}(t)$, as shown in FIG. 4(*c*), is produced in the envelope detector 60 and the differentiator 64 generates either a sharp positive pulse 82 or a negative pulse 84. Regardless of the polarity of signal, the 2-bit register 68 now becomes filled and the gate 58 is closed thus preventing the envelope detector 60 from receiving any further input. At the same time the gate 74 is momentarily opened to transfer the reading of the clock 67 to the digital-to-analog converter 76, which converts the signal to a D.C. voltage and applies it to the hold condenser 78 where it is stored to provide a measure of the delay time $\tau$. The gate 74 now closes. In the meantime the clock 67 keeps running until a count corresponding to $T_1+T_2-\epsilon$ is obtained, where $\epsilon$ is a brief element of time corresponding to approximately 1 $\mu$s. At this time the clock counter 67 and the 2-bit register 68 are cleared. The gate 58 is now opened to await the arrival of the next $Q_d(t)$ pulse 40.

The circuit 49, consisting of a phase-lock loop and memory unit 88, and a frequency translator 90, serves to generate a signal cos $\omega_1 t$ simulating the signal $P_d(t)$. Let it also be assumed that at time $t=0$ the directly received signal $Q_d(t)$, after passing through the open gate 58, is applied to the unit 88 wherein the loop portion of the unit tracks the signal and provides a sinusoidal output signal corresponding to cos $\omega_2 t$. The memory portion of the unit 88 permits the loop portion to continue generating the $\omega_2 t$ signal after the gate 58 is closed for a duration $T_1+T_2-\tau$. At this time another pulse comes in and the phase lock loop readjusts to the slightly changed conditions. The cos $\omega_2 t$ signal is then applied to the frequency translator 90 which yields a cos $\omega_1 t$ signal simulating the signal $P_d(t)$.

Figure 6:
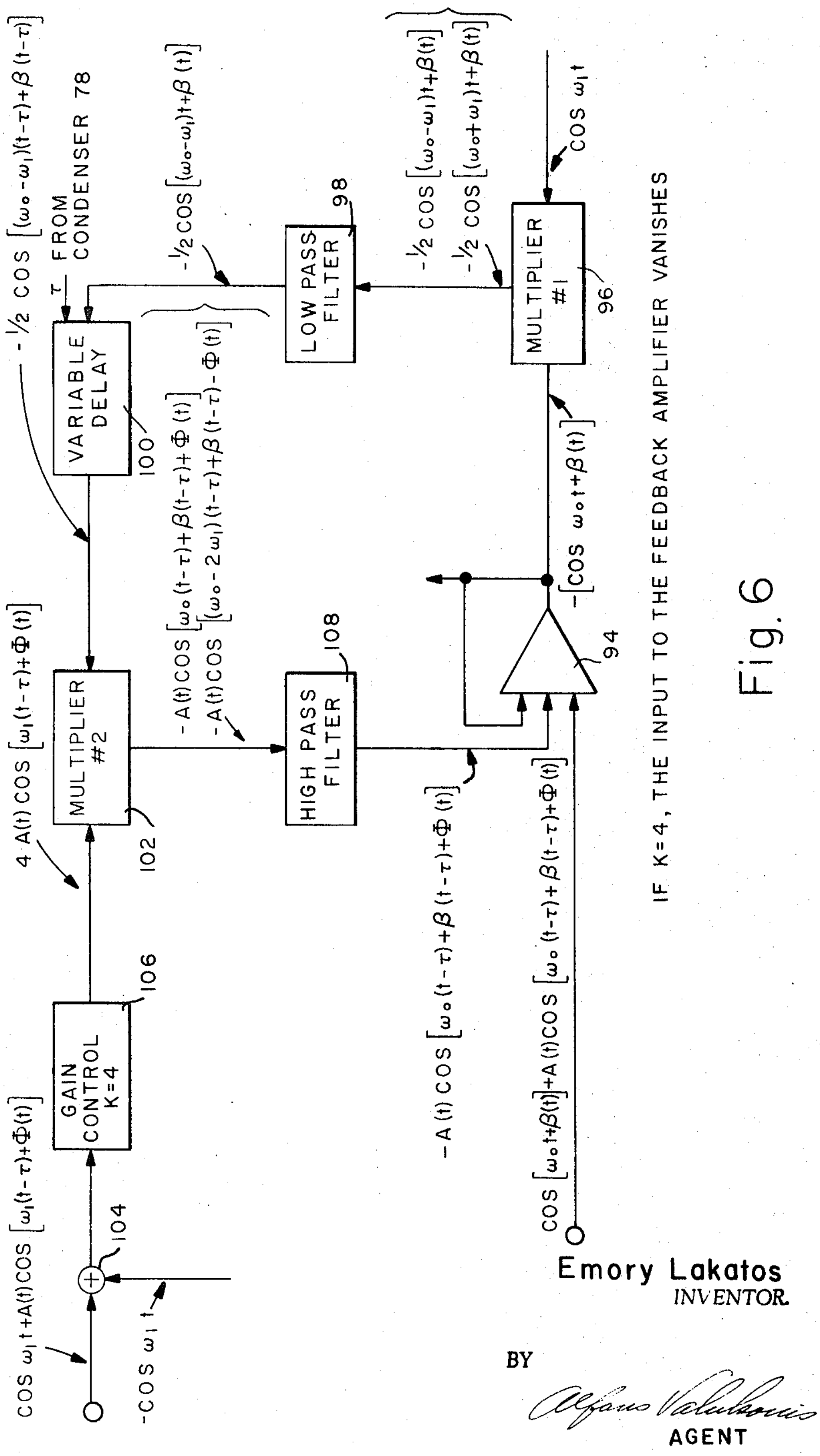
FIG. 6 is a block diagram showing of the signal extraction circuit of FIG. 5 with signal voltages to be found in various parts of the circuit.

The circuit for extracting the message signed $M_d(t)$ is generally designated by the numeral 51. Reference is made more particularly to FIG. 6 wherein the circuit 51 is shown with the leads labeled with exemplary voltage signals. To show how this circuit 49 is related to Eq. 8 consider the following: Eq. 8 is generally true regardless of the specific types of signals $M_d(t)$ and $P_d(t)$. However, a particularly simple and convenient choice is to take $P_d(t)$ as cos $\omega_1 t$, for which $$P_d(t)=\text{expi }(\omega_1 t) \quad (9)$$

Then, from (5), (7), and (9)

$$\overline{P}_{sum}(t)-\overline{P}_d(t)=\overline{P}_d(t-\tau)\overline{R}(t)=A(t)\text{ expi }[\omega_1(t-\tau)+\Phi(t)] \quad (10)$$

Thus, Eq. 8 may be rewritten as $$\overline{M}_{sum}(t)-\overline{M}_d(t)-A(t)\text{ expi }[\omega_1(t-\tau)+\Phi(t)]\overline{M}_d(t-\tau)=0 \quad (11)$$

To derive at a circuit, it is necessary to convert Eq. 11 to real quantities. Because of certain peculiarities of complex functions, this requires some care. It can be shown that the desired equation in real variables is $$M_{sum}(t)-M_d(t)-HPF\{4A(t)\text{ cos }[\omega_1(t-\tau)+\Phi(t)]M_d(t-\tau)\}=0 \quad (12)$$

where the notation HPF means that the product in the vincula is to be put through an appropriate high--pass filter.

The circuit 51 is the physical embodiment of Eq. 12 and it is valid for any form of modulation for $M_d(t)$. To demonstrate this relative to FIG. 6, let it be assumed that the output of negative feedback amplifier 94 is the message signal $-M_d(t)$. Assuming that the message $M_d(t)$ is a phase modulated wave at the carrier frequency $\omega_0$ then $-M_d(t)$ can be written $$-M_d(t)=-\cos[\omega_0+\beta(t)] \quad (13)$$

where $\beta(t)$ is the phase modulation

The signal $-M_d(t)$ or $-\cos[\omega_0 t+\beta(t)]$ is mixed in a multiplier 96 against the reference or simulating signal cos $\omega_1 t$ to provide in the output of the multiplier 96 the signal $$-\tfrac{1}{2}\cos[\omega_0-\omega_1)t+\beta(t)]-\tfrac{1}{2}\cos[\omega_0+\omega_1)t+\beta(t)]$$

Only the lower sideband resulting from the mixing in the multiplier 96 is passed by a low pass filter 98 to give $$-\tfrac{1}{2}\cos[\omega_0-\omega_1)t+\beta(t)]$$

which is the signal $-M_d(t)$ but translated in frequency to a carrier frequency of $(\omega_0-\omega_1)$.

In passing through a variable delay circuit 100 the signal $-M_d(t)$ at $(\omega_0-\omega_1)$ carrier frequency is delayed an amount and emerges as $$-\tfrac{1}{2}\cos[\omega_0-\omega_1)(t-\tau)+\beta(t-\tau)+\beta(t-\tau)]$$

to be applied to a second multiplier 102. The delay circuit 100 can be a magnetic tape arrangement. The delay circuit is set to the proper value $\tau$ by means of the delay signal obtained from the delay measurer circuit 47, as hereinbefore described. It is readily apparent that the delay $\tau$ is corrected on every pulsed pilot signal $Q_o(t)$ that is generated by the transmitter 10.

The signal $P_d(t)$ which can be written as $$P_d(t)=\cos\omega_1 t \qquad (14)$$

is substracted from the signal $P_{sum}(t)$ and is written $$P_{sum}(t)=\cos\omega_1 t+A(t)\cos[\omega_1(t-\tau)+\Phi(t)] \qquad (15)$$

to provide the signal $[P_{sum}(t)-P_d(t)]$ at a carrier frequency $\omega_1$ or otherwise expressed as $$A(t)\cos[\omega_1(t-\tau)+\Phi(t)]$$

The signal thus derived is passed through a gain control 106, which is adjusted to provide a gain of $k=4$, assuming that ideal filters are used to provide the signal $$4A(t)\cos[\omega_1(t-\tau)+\Phi(t)]$$

which is then applied to the multiplier 102 as another input. The mixing of the signal $$-\tfrac{1}{2}\cos[\omega_0-\omega_1)(t-\tau)+\beta(t)-\tau)]$$

and the signal $$4A(t)\cos[\omega_1(t-\tau)+\Phi(t)]$$

results in a signal $$-A(t)\cos[\omega_0(t-\tau)+\beta(t-\tau)+\Phi(t)]$$
$$-A(t)\cos[\omega_0-2\omega_1)(t-\tau)+\beta(t-\tau)-\Phi(t)]$$

only the upper sideband resulting from the mixing in the multiplier 102 is passed by a high pass filter 108 to provide in its output the signal $$A(t)\cos[\omega_0(t-\tau)+\beta(t)+\Phi(t)]$$

which is applied to the input of the amplifier 94 along with the signal fed back from the output of aplifier 94, namely $$-\cos[\omega_0 t+\beta(t)]$$

Since $M_{sum}(t)$ can be expressed as $$M_{sum}(t)=\cos[\omega_0{}^t+\beta(t)]+A(t)\cos[\omega_0(t-\tau)+\beta(t-\tau)+\Phi(t)] \qquad (16)$$

and since the sum of the inputs to the amplifier add up to zero, as they should in a feedback amplifier arrangement, the output of the amplifier is indeed $-M_d(t)$. The signal $-M_d(t)$ is then fed to a demodulator (not shown) wherein recovery of the message is readily obtained.

It being understood that the specific embodiment of the invention shown and described is illustrative only, various modifications may be made therein without departing from the scope and spirit of this invention as set forth in the appended claims.

What is claimed is:

1. A communications system comprising:

transmitter means for radiating message, continuous pilot, and modulated pilot signals having first, second, and third carrier frequencies, respectively, through a transmission medium wherein multipath effects produce summed message, summed continuous pilot, and summed pulsed pilot signals, respectively, said summed signals each including a direct path signal and an echo signal; and receiver means responsive to said signals for recovering said direct path message signal from said summed signals, said receiver means comprising means for separating said summed message, continuous pilot, and pulsed pilot signals;

means connected to said signal separation means and responsive to said direct path and echo pulsed pilot signals for measuring the time delay between said direct and echo pulsed pilot signals to generate a delay signal representing said time delay;

means connected to said delay measurer means and responsive to said direct path pulsed pilot signal for generating a signal simulating said direct path continuous pilot signal; and circuit means connected to said separation and measurer means and responsive to said summed message, summed continuous pilot signal, delay signal, and simulating signal for extracting said direct path message signal from said summed message signal.

2. The communications system of claim 1 wherein said signal separation means comprises:

signal filter means.

3. The communications system of claim 1 wherein said measurer means comprises:

a first gate circuit connected to said signal separating means for passing said direct path and echo pulsed pilot signals when opened and for preventing the passage of any signals when closed;

a pulse generator connected to said first gate circuit and responsive to said direct path and echo pulsed pilot signals for generating a pair of pulses, respectively;

a timer circuit connected to said pulse generator and said first gate circuit, said timer circuit being responsive to said pair of pulses for generating a timing signal representing the time interval between said pair of pulses and a first gating signal to open said first gate circuit after a predetermined period of time;

a storage circuit connected to said pulse generator and said first gate circuit, said storage circuit being responsive to said pair of pulses for generating a second gating pulse to close said first gate circuit;

a second gate circuit connected to said timer circuit and said storage circuit, said second gate circuit being responsive to said second gating pulse to pass said timing signal;

circuit means connected to said second gate circuit for converting said timing signal into an analog signal; and circuit means connected to said converting circuit means for holding said analog signal to provide said delay signal.

4. The communications system of claim 3 wherein said pulse generator comprises:

envelope detector circuit means for detecting said direct path and echo path pulsed signals; and differentiator circuit means connected to said envelope detector circuit means and responsive to said detected direct path and echo pulsed signals for generating said pair of pulses, respectively.

5. The communications system of claim 3 wherein said timer circuit comprises:

binary counter means.

6. The communications system of claim 3 wherein said predetermined period of time is of a duration $$T_1+T_2-\epsilon$$

wherein $T_1$ is the duration of one pulse of said direct path pulsed signal, $T_2$ is the interval between pulses of said direct path pulsed signal, and $\epsilon$ is a predetermined duration of time on the order of 1 microsecond.

7. The communications system of claim 3 wherein said storage circuit comprises:

a 2-bit register.

8. The communications system of claim 3 wherein said converting circuit means comprises:

a digital to analog converter.

9. The communications system of claim 3 wherein said holding circuit means comprises:

capacitor means.

10. The communications system of claim 1 wherein said means for generating said simulating signal comprises:

a phase-lock loop circuit for tracking said direct path pulsed signal to generate a sinusoidal signal having said third predetermined carrier frequency; and frequency translating circuit means connected to said phase-lock loop circuit for converting said third predetermined carrier frequency of said sinusoidal signal to said second predetermined carrier frequency to provide said simulating signal.

11. The communications system of claim 1 wherein said signal extracting circuit means comprising:

a negative feedback amplifier having its input connected to said separating means and adapted to be responsive to said summed message signal;

signal summing means connected to said separating means and said simulating signal generator means for summing said summed continuous pilot signal and said simulating signal to produce the continuous pilot echo signal at said second carrier frequency;

a first signal multiplier circuit connected to the output of said negative feedback amplifier and said simulating signal generator means for providing a first product signal representing the product of said direct path message signal and said simulating signal;

signal filter means connected to said first signal multiplier circuit for passing said direct path message signal of said first product signal at a carrier frequency which is the difference between said first and second carrier frequencies;

variable signal time delay means connected to said signal filter means and said delay measurer means for providing in its output a delayed direct path message signal at said difference carrier frequency delayed a time interval represented by said delay signal;

gain control circuit means;

a second signal multiplier circuit means connected through said gain control circuit means to said signal summing means and said variable delay means for providing in its output a product signal representing the product of said continuous pilot echo signal and said delayed direct path message signal; and signal filter means connected to said second signal multiplier circuit means and said negative feedback amplifier for passing said second product signal at said first carrier frequency to said feedback amplifier to provide in its output said direct path message signal at said first carrier frequency.

12. The communications system of claim 1 wherein said receiver means comprises:

signal filter means for separating said summed message, continuous pilot, and pulsed pilot signals;

a first gate circuit connected to said filter means for passing said direct path and echo path pulsed pilot signals when opened and for preventing the passage of signals when closed;

envelope detector circuit means connected to said first gate circuit for detecting said direct path and echo path pulsed signals;

differentiator circuit means connected to said envelope detector circuit means and responsive to said detected direct path and echo pulsed pilot signals for generating a pair of pulses;

binary counter means connected to said differentiator circuit means and responsive to said pair of pulses for generating a timing signal representing the time interval between said pair of pulses and a first gating signal to open said first gate circuit after a predetermined period of time, said predetermined period of time being of a duration $$T_1+T_2-\epsilon$$

wherein $T_1$ is the duration of one pulse of said direct path pulse pilot signal, $T_2$ is the interval between pulses of said direct path pulsed pilot signal, and $\epsilon$ is the predetermined element of time on the order of 1 microsecond;

a two-bit register connected to said differentiator circuit and said first gate circuit, said register being responsive to said pair of pulses for generating a second gating pulse to close said first gate circuit;

a second gate circuit connected to said binary counter means and said register, said second gating circuit being responsive to said second gating pulse to pass said timing signal;

a digital-to-analog converter connected to said second gate circuit for converting said timing signal to an analog signal;

capacitor means connected to said digital-to-analog converter for holding said analog signal to provide a delay signal representing the difference between the times of arrival of said direct path and echo path pulsed pilot signals at the receiver;

a phase-lock loop circuit connected to said first gate circuit for tracking said direct path pulsed pilot signal to generate a sinusoidal signal having said third predetermined carrier frequency;

frequency translating circuit means connected to said phase-lock loop circuit for converting said third predetermined frequency of said sinusoidal signal to said second predetermined frequency to provide a signal simulating said continuous pilot signal;

signal summing means connected to said signal filter means and said frequency translating circuit means for summing said summed pulsed pilot signal and said simulating signal to produce a difference signal at second carrier frequency;

a negative feedback amplifier having its input connected to said signal filter means and adapted to be responsive to said summed message signal;

a first signal multiplier circuit connected to output of said negative feedback amplifier and said frequency translating circuit means for providing a first product signal representing the product of said path message signal and said simulating signal;

signal filter means connected to said first signal multiplier circuit for passing said message signal of said first product signal at a carrier frequency which is the difference between said first and second carrier frequencies;

variable delay means connected to said filter means and said capacitor means for providing in its output said message signal delayed in an amount represented by said delay signal;

a second signal multiplier means connected to said signal summing means and said variable delay means for providing in its output a product signal representing the product of said difference signal and said delayed direct message signal; and signal filter means connected to said second multiplier circuit means and said negative feedback amplifier for passing said second product signal at said first carrier frequency to said feedback amplifier to provide in its output said direct message signal at said first carrier frequency.

13. A communications system comprising:

means for generating a message signal having first predetermined carrier frequency;

means connected to said message signal generator means and responsive to said message signal for generating a continuous pilot signal having a second predetermined carrier frequency and a pulsed pilot signal having a third predetermined carrier frequency;

means connected to said message signal continuous pilot, and pulsed pilot generator means for summing all said signal;

means connected to said summing means for radiating said message, continuous pilot, and pulsed pilot signals through a transmission medium wherein multipath effects produce summed message, continuous pilot, and pulsed pilot signals, respectively, said summed signals each including a direct path signal and an echo signal;

means for separating said summed message, continuous pilot, and pulsed pilot signals;

means connected to said separation means and responsive to said direct and specular path pulsed pilot signals for generating a delay signal representing the difference between the times of arrival of said direct path and echo path pilot signals;

means connected to said delay signal generator means and responsive to said direct path pulsed pilot signal for generating a signal simulating said continuous pilot signal; and means connected to said separation and generator means and responsive to said summed message and continuous pilot signals, delay signal, and simulating signal for extracting said direct path message signal from said summed message signal.

14. A communications receiver for receiving signals consisting of message, continuous pilot, and pulsed pilot signals of first, second, and third carrier frequencies, respectively, radiated through a transmission medium wherein multipath effects produce summed message, continuous pilot, and pulsed pilot signals at the receiver, respectively, said summed signals each including a direct path signal and an echo signal, said receiver comprising:

means for separating said summed message, continuous pilot, and pulsed pilot signals;

means connected to said signal separation means and responsive to said direct path echo pulsed pilot signals for measuring the time delay between said direct and echo pulsed pilot signals to generate a delay signal representing said time delay;

means connected to said delay measurer means and responsive to said direct path pulsed pilot signal for generating a signal simulating said direct path continuous pilot signal; and circuit means connected to said separation and measurer means and responsive to said summed message, summed continuous pilot signal, delay signal, and simulating signal for extracting said direct path message signal from said summed message signal.

15. The communications receiver of claim 14 wherein said signal separation means comprises:

signal filter means.

16. A communication receiver as set forth in claim 14 wherein said measurer means comprises:

a first gate circuit connected to said signal separating means for passing said direct path and echo pulsed pilot signals when opened and for preventing the passage of any signals when closed;

a pulse generator connected to said first gate circuit and responsive to said direct path and echo pulsed pilot signals for generating a pair of pulses, respectively;

a timer circuit connected to said pulsed generator and said first gate circuit, said timer circuit being responsive to said pair of pulses for generating a timing signal representing the time interval between said pair of pulses and a first gating signal to open said first gate circuit after a predetermined period of time;

a storage circuit connected to said pulse generator and said first gate circuit, said storage circuit being responsive to said pair of pulses for generating a second gating pulse to close said first gate circuit;

a second gate circuit connected to said timer circuit and said storage circuit, said second gate circuit being responsive to said second gating pulse to pass said timing signal;

circuit means connected to said second gate circuit for converting said timing signal into an analog signal; and circuit means connected to said converting circuit means for holding said analog signal to provide said delay signal.

17. The communications receiver of claim 16 wherein said pulse generator comprises:

envelope detector circuit means for detecting said direct path and echo path pulse signals; and differentiator circuit means connected to said envelope detector circuit means and responsive to said detected direct path and echo pulsed signals for generating said pair of pulses, respectively.

18. The communications receiver of claim 16 wherein said timer circuit comprises:

binary counter means.

19. The communications receiver of claim 16 wherein said predetermined period of time is of a duration $$T_1+T_2-\epsilon$$

wherein $T_1$ is the duration of one pulse of said direct path pulse signal, $T_2$ is the interval between pulses of said direct path pulse signal, and $\epsilon$ is a predetermined duration of time on the order of one microsecond.

20. The communications receiver of claim 16 wherein said storage circuit comprises:

a two-bit register.

21. The communications receiver of claim 16 wherein said converting circuit means comprises:

a digital-to-analog converter.

22. The communications receiver of claim 16 wherein said holding circuit means comprises:

capacitor means.

23. The communications receiver of claim 16 wherein said means for generating said simulating signal comprises:

a phase lock loop circuit for tracking said direct path pulse signal to generate a sinusoidal signal having said third predetermined carrier frequency; and frequency translating circuit means connected to said phase lock loop circuit for converting said third predetermined carrier frequency of said sinusoidal signal to said second predetermined carrier frequency to provide said simulating signal.

24. The communications receiver of claim 16 wherein said signal extracting circuit means comprises:

a negative feedback amplifier having an input connected to said separating means and adapted to be responsive to said summed mesage signal;

signal summing means connected to said separating means and said simulating signal generator means for summing said summed continuous pilot signal and said simulating signal to produce the continuous pilot echo signal at said second carrier frequency;

a first signal multiplier circuit connected to the output of said negative feedback amplifier and said simulating signal generator means for providing a first product signal representing the product of said direct path message signal and said simulating signal;

signal filter means connected to said first signal multiplier circuit for passing said direct path message signal of said first product signal at a carrier frequency which is the difference between the first and second carrier frequency;

variable signal time delay means connected to said signal filter means and said delay measurer means for providing in its output a delayed direct path message signal at said difference carrier frequency delayed a time interval represented by said delayed signal;

gain control circuit means;

a second signal multiplier circuit means connected through said gain control circuit means to said signal summing means and said variable delay means for providing in its output a product signal representing the product of said continuous pilot echo signal and said delayed direct path message signal; and signal filter means connected to said second signal multiplier circuit means and said negative feedback amplifier for passing said second product signal at said first carrier frequency to said feedback amplifier to provide in its output said direct path message signal at said first carrier frequency.

25. A circuit for providing a delay signal measuring the time delay between a pair of signals comprising:

a first gate circuit for passing said pair of signals when opened and for preventing passage of any signals when closed;

a pulse generator connected to said first gate circuit and responsive to said pair of signals for generating a pair of pulses, respectively;

a timer circuit connected to said pulse generator and said first gate circuit, said timer circuit being responsive to said pair of pulses for generating a timing signal representing the time interval between said pair of pulses and a first gating signal to open said first gate circuit after a predetermined period of time;

a storage circuit connected to said pulse generator and said first gate circuit, said storage circuit being responsive to said pair of pulses for generating a second gating pulse to close said first gate circuit;

a second gate circuit connected to said timer circuit and said storage circuit, said second gate circuit being responsive to said second gating pulse to pass said timing signal;

circuit means connected to said second gate circuit for converting said timing signal into an analog signal; and circuit means connected to said converting circuit means for holding said analog signal to provide said delay signal.

26. The circuit of claim 25 wherein said pulse generator comprises:

envelope detector means for detecting said pair of signals; and differentiator circuit means connected to said envelope detector means and responsive to said detected pair of signals for generating said pair of pulses, respectively.

27. The circuit of claim 25 wherein said timer circuit comprises:

binary counter means.

28. The circuit of claim 25 wherein said storage circuit comprises:

a two-bit register.

29. The circuit of claim 25 wherein said converting means comprises:

a digital-to-analog converter.

30. The circuit of claim 25 wherein said holding circuit means comprises:

capacitor means.

31. The circuit of claim 25 wherein each of said pair of signals comprises:

a pulsed signal.

32. The circuit of claim 31 wherein said predetermined period of time is of a duration $$T_1+T_2-\epsilon$$

wherein $T_1$ is the duration of a single pulse of one of said pulsed signals, $T_2$ is the interval between pulses of said one pulsed signal, and $\epsilon$ is a predetermined duration of time on the order of 1 microsecond.

33. A signal extracting circuit for a communications receiver responsive to radiated message, continuous pilot, and pulsed pilot signals having first, second, and third carrier frequencies, respectively, through a transmission medium wherein multipath effects produce summed message, continuous pilot, and pulsed pilot signals, respectively, said summed signals each including a direct path signal and an echo signal, said signal extraction circuit comprising:

a negative feedback amplifier responsive to said summed message signal;

signal summing means responsive to said summed continuous pilot signal and a signal simulating said direct path continuous pilot signal for producing said continuous pilot echo signal;

a first signal multiplier circuit connected to the output of said negative feedback amplifier and responsive to said simulating signal for providing a first product signal representing the product of said direct path message signal and said simulating signal;

signal filter means connected to said multiplier circuit for passing said direct path message signal of said first product signal at a carrier frequency which is the difference between said first and second carrier frequencies;

variable signal time delay means connected to said signal filter means and responsive to a delay signal representing a delay time interval for providing in its output a delayed direct path message signal at said difference carrier frequency delayed a time interval represented by said delay signal;

gain control circuit means;

a second signal multiplier circuit means connected through said gain control circuit means to said signal summing means and said variable delay means for providing in its output a product signal representing the product of said continuous pilot echo signal and said delayed direct path message signal; and signal filter means connected to said second signal multiplier circuit means and said negative feedback amplifier for passing said second product signal at said first carrier frequency to said feedback amplifier to provide in its output said direct path message signal at said first carrier frequency.

34. The direct path message signal extracting circuit of claim 33 wherein said gain control circuit means has a gain $K=4$.

References Cited

UNITED STATES PATENTS

| | | | |
|---|---|---|---|
| 3,213,450 | 10/1965 | Goor | 325—474 |
| 3,293,551 | 12/1966 | Ehrich | 325—474 |
| 3,404,229 | 10/1968 | Downey et al. | 178—67 |
| 3,444,468 | 5/1969 | Drouilhet et al. | 333—18 X |

FOREIGN PATENTS

| | | |
|---|---|---|
| 542,023 | 12/1941 | Great Britain. |

RICHARD MURRAY, Primary Examiner

B. V. SAFOUREK, Assistant Examiner

U.S. Cl. X.R.

325—61, 474